United States Patent
Korn et al.

(10) Patent No.: US 7,249,894 B1
(45) Date of Patent: Jul. 31, 2007

(54) SYSTEM AND PROCESS FOR POST ALIGNMENT POLARIZATION EXTINCTION RATIO COMPENSATION IN SEMICONDUCTOR LASER SYSTEM

(75) Inventors: Jeffrey A. Korn, Lexington, MA (US); Peter S. Whitney, Lexington, MA (US); Dale C. Flanders, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 826 days.

(21) Appl. No.: 09/707,710

(22) Filed: Nov. 7, 2000

(51) Int. Cl.
  *G02B 6/36* (2006.01)
  *H01S 3/10* (2006.01)
(52) U.S. Cl. .............................. 385/92; 385/93; 372/20
(58) Field of Classification Search .................. 372/20, 372/3; 385/93, 92
See application file for complete search history.

(56) References Cited

U.S. PATENT DOCUMENTS

| 4,673,244 | A | * | 6/1987 | Miles ......................... 359/900 |
| 4,874,217 | A | | 10/1989 | Janssen ...................... 350/96.2 |
| 5,553,182 | A | | 9/1996 | Haake ......................... 385/89 |
| 6,292,288 | B1 | * | 9/2001 | Akasaka et al. ............. 359/124 |

(Continued)

FOREIGN PATENT DOCUMENTS

DE  34 31 775 A1  3/1986

(Continued)

OTHER PUBLICATIONS

Shah, V., et al., "*Packaging Technology forHigh-Power, Singlemode-Fiber-Pigtailed Pump Laser Modules for Er-Doped Fiber Amplifiers*", 1992 IEEE, pp. 842-847.

(Continued)

*Primary Examiner*—Tarifur Chowdhury
(74) *Attorney, Agent, or Firm*—Houston Eliseeva LLP

(57) ABSTRACT

A system and process for tuning the PER of an electronic system during and/or after its manufacture includes fixtures that allow for the axial rotation of the polarization-maintaining optical fiber relative to the optical system after the optical fiber has been installed in the system. The degradation in the PER ratio of the optical system results from mechanical stresses placed on the fiber during the manufacture of the systems. For example, in the case of optical pump manufacturing, the semiconductor laser is installed on a submount. The PM fiber enters a package through a fiber feedthrough in a ferrule and then is secured down onto the submount, such that the endface of the pigtail is held in proximity to the exit facet of the semiconductor laser. In such systems, highly robust fixturing processes are used, typically such as solder bonding, in which the fiber is metallized and solder bonded either directly or indirectly to the submount. Further, solder is typically applied to seal the ferrule around the fiber since these packages must be hermetically sealed to provide for the long-term stable operation. The solder bonding processes can create asymmetries in the residual stress fields applied around the circumference of the fiber after the solder has cooled. These asymmetric stress fields lead to distortions in the stress-induced birefringent medium of the fiber. This results in coupling between the two polarization modes of the PM fiber, and consequently the degradation of the PER of the system from that expected from the separate components, for which the present invention can compensate.

13 Claims, 7 Drawing Sheets

U.S. PATENT DOCUMENTS 6,340,831 B1 * 1/2002 Kuhara et al. ............... 257/461
6,345,059 B1 * 2/2002 Flanders ...................... 372/19

FOREIGN PATENT DOCUMENTS

| DE | 43 07 974 C1 | 8/1994 |
| EP | 0 971 252 A2 | 1/2000 |
| GB | 2 229 856 A | 10/1990 |
| WO | WO 91/06022 | 5/1991 |

OTHER PUBLICATIONS

Moyer, R.S., et al., "*Design and Qualification of Hermetically Packaged Lithium Niobate Optical Modulator*", 1997 Electronic Components and Technology Conference, 1997 IEEE, pp. 425-429.

* cited by examiner

SYSTEM AND PROCESS FOR POST ALIGNMENT POLARIZATION EXTINCTION RATIO COMPENSATION IN SEMICONDUCTOR LASER SYSTEM

BACKGROUND OF THE INVENTION

Polarization control is required in many different types of fiber optic applications. The typical modality for obtaining this control is polarization-preserving or polarization-maintaining optical fiber. Standard single-mode optical fiber supports two orthogonal eigenmodes or polarizations. In nominally circular fibers, the polarization modes are degenerate with an identical propagation constant and group phase velocity.

Polarization-maintaining (PM) fiber is sometimes referred to as high birefringence single-mode fiber. PM fiber utilizes a stress-induced birefringence mechanism to achieve high levels of birefringence such that polarized light travels at different speeds along the orthogonal polarized axes of the fiber. Typically, these fibers embed a stress-applying region in the cladding area of the fiber. When placed symmetrically about the core, it gives a fiber cross-section two distinct axes of symmetry. These cross-sections range from elliptical to rectangular. This results in the propagation speed to be polarization dependent for light polarized along the two orthogonal symmetry axes. As a result, light propagating and polarized along one axis of symmetry does not efficiently couple into the orthogonal polarization.

One technique for quantifying the extent to which PM fiber maintains polarization is the polarization extinction ratio (PER). This ratio quantifies the degree to which light is polarized along one axis. Thus, it represents to what extent the PM fiber is maintaining polarization. Typically, there is little or no cross-coupling of optical power between the polarization modes.

In a number of different applications, controlling how light is launched into PM fiber or how light is emitted from PM fiber is useful. Semiconductor laser devices often have high polarization anisotropy. Thus, they generate light in typically one polarization depending on how the epitaxial tensile or compressive layer stresses are crafted. It is often desirable to launch this single polarization light into PM fiber and have its single polarization state maintained. Contrastingly, single mode polarized light from a PM fiber may be coupled into a polarization anisotropic device, such as a semiconductor optical amplifier (SOA). In this case, it is necessary to emit light with a polarization state aligned to the preferred polarization axis of the SOA. As a result, in these two different general applications, it can be necessary to rotationally adjust the PM fiber relative to the semiconductor optical device.

One specific example where polarization control is required is in the pump lasers used to optically pump gain fiber such as regular fiber in Raman pumping schemes or erbium-doped fiber. Polarization control is required for two different reasons.

The first is related to the fact that many times these pumps are temporally power stabilized using fiber Bragg gratings. The gratings create an external cavity that feeds-back light into the semiconductor gain medium. These semiconductor gain mediums have high polarization anisotropy. Polarization stability is thus required between the semiconductor gain medium and the fiber Bragg grating to ensure that the level of feedback seen by the pump laser is constant.

Polarization stability is also required between the pump laser chip, with or without Bragg grating stabilization, and the gain fiber in the Raman pumping scheme. Polarization isotropic fiber amplifiers are typically preferred. Raman amplification depends on whether the polarization of pump light is the same as the optical signal to be amplified, however. Thus, most Raman systems require unpolarized pump light. This is typically produced using the light from two semiconductor lasers with balanced orthogonal polarizations. PM fiber is typically deployed between the combiner and the separate pump lasers.

SUMMARY OF THE INVENTION

High quality PM optical fiber is commercially available. This fiber has very good PER ratios, when polarized light is launched parallel to one of the fiber's axis—there is very little coupling of a polarization launched along one axis of the fiber coupling into the other axis.

Problems arise, however, when this fiber is integrated into larger optical systems. That is, the PER of the system is typically lower than the fiber itself. For example, in the case of semiconductor laser launching into PM fiber, the semiconductor laser generates light at only one polarization, and the fiber can be rotationally aligned accurately to the semiconductor laser. As a result, it would be expected that light exiting from the PM fiber would only have a single polarization. Many times, however, this is not the case, especially in systems that are manufactured for commercial applications.

The degradation in the PER ratio of the optical system results from mechanical stresses placed on the fiber during the manufacture of the systems. For example, in the case of optical pump manufacturing, the semiconductor laser is installed on a submount. The PM fiber enters a package through a fiber feedthrough in a ferrule and then is secured down onto the submount, such that the endface of the pigtail is held in proximity to the exit facet of the semiconductor laser. In such systems, highly robust fixturing processes are used, typically such as solder bonding, in which the fiber is metallized and solder bonded either directly or indirectly to the submount. Further, solder is typically applied to seal the ferrule around the fiber since these packages must be hermetically sealed to ensure stable long-term operation. During the solder bonding processes, asymmetries can arise in the residual stress fields applied around the circumference of the fiber after the solder has cooled. These asymmetric stress fields lead to distortions in the stress-induced birefringent medium of the fiber. This results in coupling between the two polarization modes of the PM fiber that consequently degrade the PER of the system from that expected from the separate components.

The present invention is directed to a system and process for tuning the PER of an electronic system during and/or after its manufacture. Specifically, fixtures are provided that allow for the axial rotation of the optical fiber relative to the optical system after the optical fiber has been installed in the system.

In general, according to one aspect, the invention features a semiconductor laser system. It comprises a package including a floor and sidewalls, which extend from the floor. A submount is installed in the package, with a semiconductor chip being installed on the submount. PM optical fiber extends into the package via a ferrule and is secured to the submount via a mounting structure, such that its endface is held in proximity to the semiconductor chip. According to the invention, the mounting structure is deformable to enable the axial rotation of the optical fiber endface after the optical fiber attachment to the mounting structure.

In one embodiment, the semiconductor laser system is a semiconductor pump laser operating at 1400 to 1600 nanometers (nm), and thus, applicable to Raman pumping schemes. The fiber endface comprises a generally cylindrical or a spheric lens shape to a double-angle wedge-shaped endface. Further, a Bragg grating is provided to yield an external cavity device to stabilize the operation of the system.

In general, according to another aspect, the invention features a process for manufacturing a semiconductor laser system. The process comprises installing a semiconductor chip in a package and then inserting PM optical fiber through a fiber feedthrough into the package. The endface of the optical fiber is then secured to the package to receive light generated by the semiconductor chip.

According to the invention, after the step of securing the endface, a polarization extinction ratio (PER) of the light transmitted through the fiber from the semiconductor chip is detected. The endface of the fiber is then axially rotated to modify or improve the polarization extinction ratio.

In one embodiment, the manufacturing process further comprises a step of aligning the endface to the semiconductor chip. In one implementation, an active alignment process is used in which the semiconductor chip is energized and the magnitude of light coupled into the optical fiber monitored. The endface is then moved relative to the semiconductor chip to maximize the coupling efficiency.

In one implementation, the fiber is secured to a mounting structure that is then plastically deformed to actively align the fiber endface during the active alignment process. In another implementation, the optical fiber is realigned to the endface and then secured to the mounting structure and the mounting structure secured to the submount.

In any case, once the fiber is secured to the submount and preferably the ferrule sealed around the fiber, an extinction ratio of the light transmitted through the fiber is determined. Typically, this is accomplished by detecting a magnitude of light transmitted along a slow axis of the PM fiber and detecting a magnitude of light transmitted along a fast axis of the PM fiber. The endface of the fiber is then axially rotated by deforming the mounting structure that secures the optical fiber to the package. In one case, the mounting structure is deformed until a desired polarization extinction ratio as detected. Then, the mounting structure is further deformed such that when it is released, the mounting structure will hold the fiber in an orientation corresponding to the desired polarization extinction ratio.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
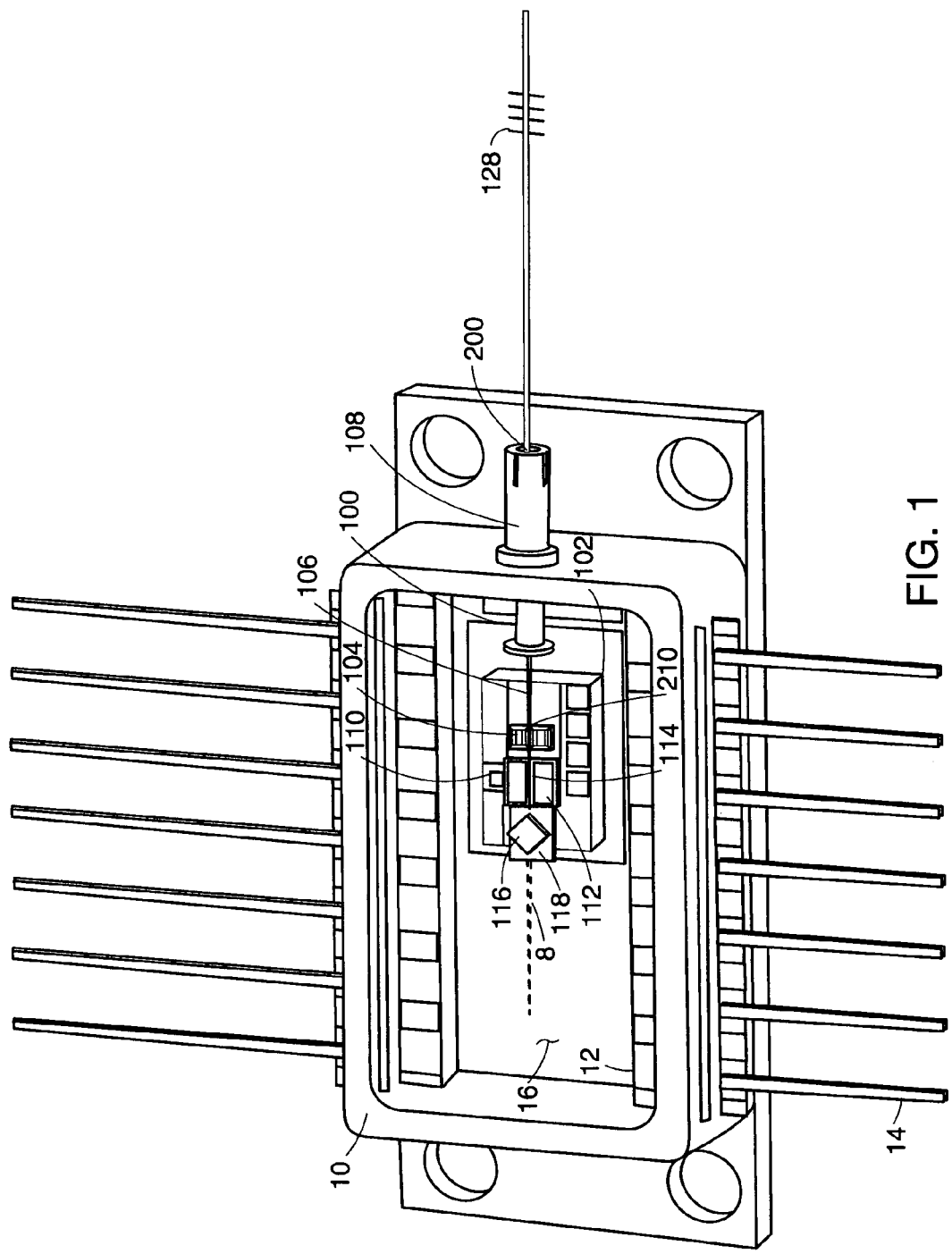
FIG. 1 is a perspective view of a semiconductor laser system according to the present invention, with the lid cut away.

FIG. 1 shows a semiconductor laser system, which has been constructed according to the principles of the present invention.

Specifically, the system comprises a package 10. In the illustrated example, a butterfly package is used in which leads 14 extend laterally from the package. In other implementations, the invention can also be applied to DIP packages where the leads 14 extend orthogonally from the floor 12 of the package 10.

In the illustrated cooled laser system, a thermo-electric cooler 100 is installed on the floor 16 of the package 10. These coolers are typically driven in response to the temperature within the package, detected by thermistor 110 for example, to maintain a temperature-stable operating environment for the semiconductor laser chip.

A bench or submount 102 is secured to the cooler 100. In the preferred embodiment, the bench is constructed from a mechanically and temperature stable substance, such as aluminum nitride, silicon, silicon-metal composite, silicon oxide, or beryllium oxide in various implementations.

Semiconductor laser chip 114 is connected to the bench 102. The chip is preferably an edge-emitting ridge, striped semiconductor chip as are used in carrier-class pump lasers, for example. It generates light preferably at about 980 or 1480 nanometers, where there are absorption peaks in erbium-doped fiber. Alternatively, it generates light in the range of 1400 to 1600 nm, i.e., 14xx, in case of a Raman pumping scheme. The chip stripe defines a medial line 8 of the system.

In more detail, the chip is bonded to a substrate 112 to form a chip hybrid. This chip hybrid is then preferably solder-bonded to the bench 102. A monitoring diode 116 is installed on the bench 102 behind a back facet of the chip 114. Specifically, the monitoring diode 116 is installed on a pedestal structure 118, which is similarly solder-bonded to the bench 102.

In the current embodiment, the diode 118 is laid-down on the bench 102. That is, the active surface 122 of the monitoring diode is in a plane that is parallel or substantially parallel to the surface of the bench 102.

An optical fiber pigtail 106 enters the package 10 through a fiber feedthrough in which a ferrule 108 is installed. The endface of the fiber pigtail is secured to the bench 102 in proximity to the front facet of the semiconductor chip 114 along the laser stripe-defined medial line 8. Specifically, in the preferred embodiment, a deformable fiber mounting structure 104 is used so that the endface is held in a stable but adjustable relationship to the semiconductor laser front facet.

The present invention has particular applicability to pump lasers incorporating Bragg grating stabilization where PM fiber is common. Specifically, in one implementation, the fiber pigtail 106 comprises a Bragg grating 128 that is formed in the fiber pigtail.

Reference numerals 200 and 210 illustrate two locations where asymmetrical stress fields can arise around the PM fiber pigtail 106 to thereby undermine the PER of the opto-electronic system.

Figure 2:
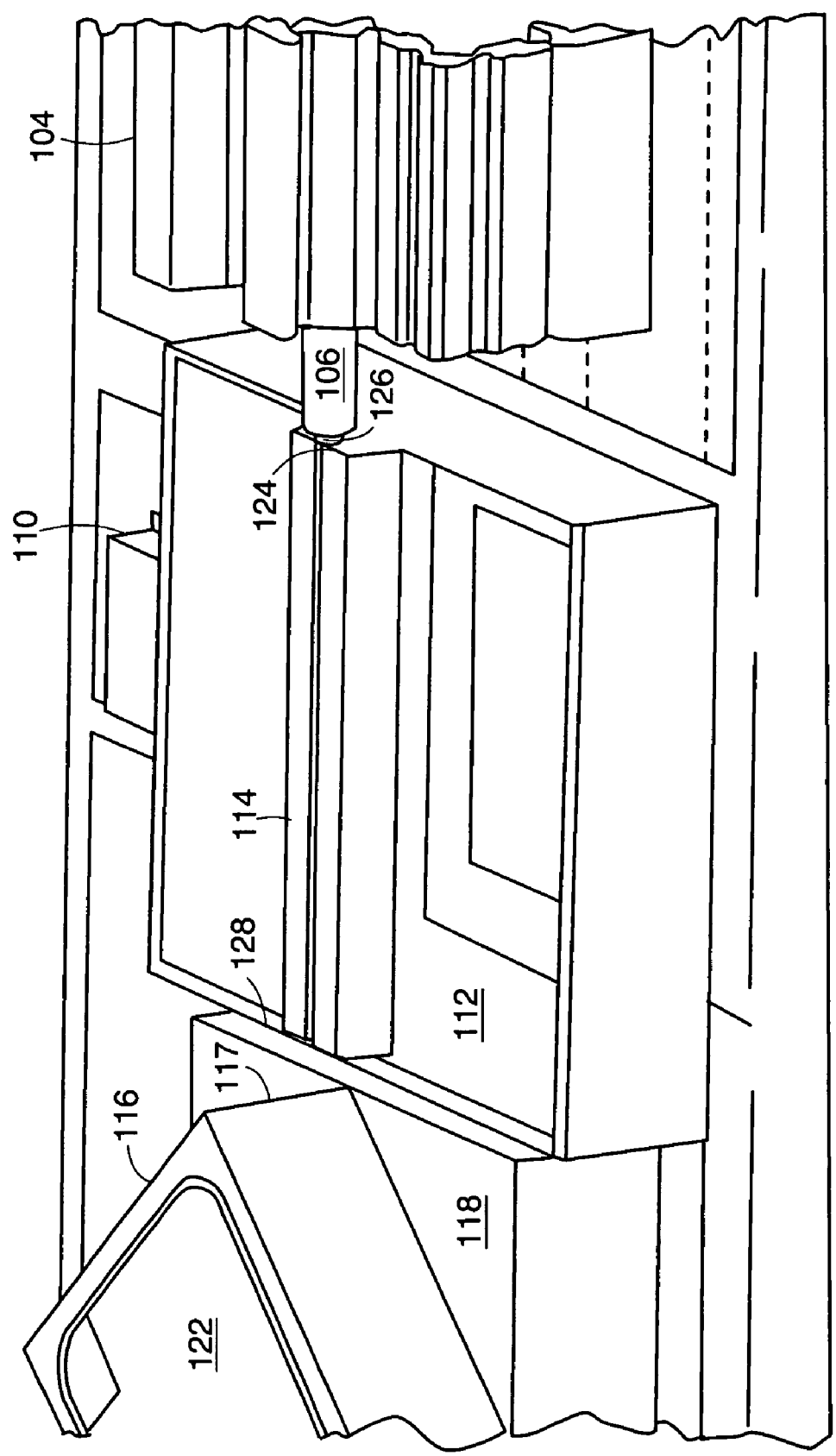
FIG. 2 is a close up perspective view of the semiconductor laser chip, showing the fiber endface, chip facets, and the monitoring diode.

FIG. 2 shows the details of the orientation of the semiconductor laser chip 114, the monitoring diode 116 and the fiber endface 126. Specifically, the double angle wedge shape fiber or other aspheric endface 126 is located in front of the stripe of the semiconductor chip 114 opposite the chip's front facet 124.

Fiber lens coupling system typically yield good coupling efficiencies of between 70 to 80% in which the light that is emitted from the front facet 124 is coupled to propagate in the fiber pigtail 106.

Figure 3:
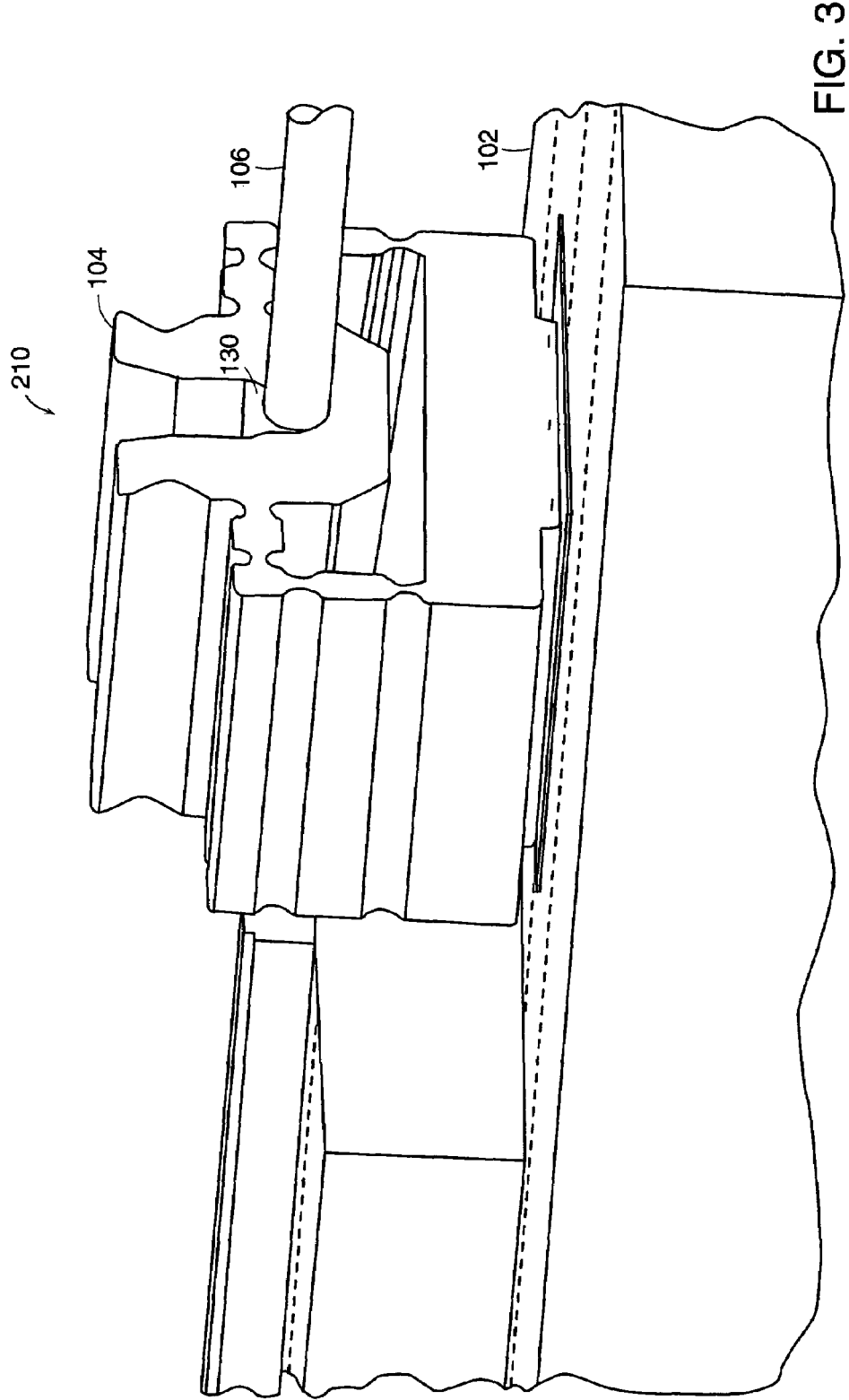
FIG. 3 is a perspective view of the PM optical fiber held in a fiber mounting structure on the optical bench or submount according to the present invention.

FIG. 3 shows a mounting structure 104 that enables the PER compensation according to the present invention and the source of the potential first asymmetric stress field 210. Specifically, as is common, the PM fiber 106, which may have been previously metallized, is solder bonded (130) to the mounting structure 104, which secures the fiber 106 to the bench or submount 102. This solder bonding or other bonding process may result in an asymmetrical stress field being applied to the fiber 106, which degrades its PER.

Figure 4:
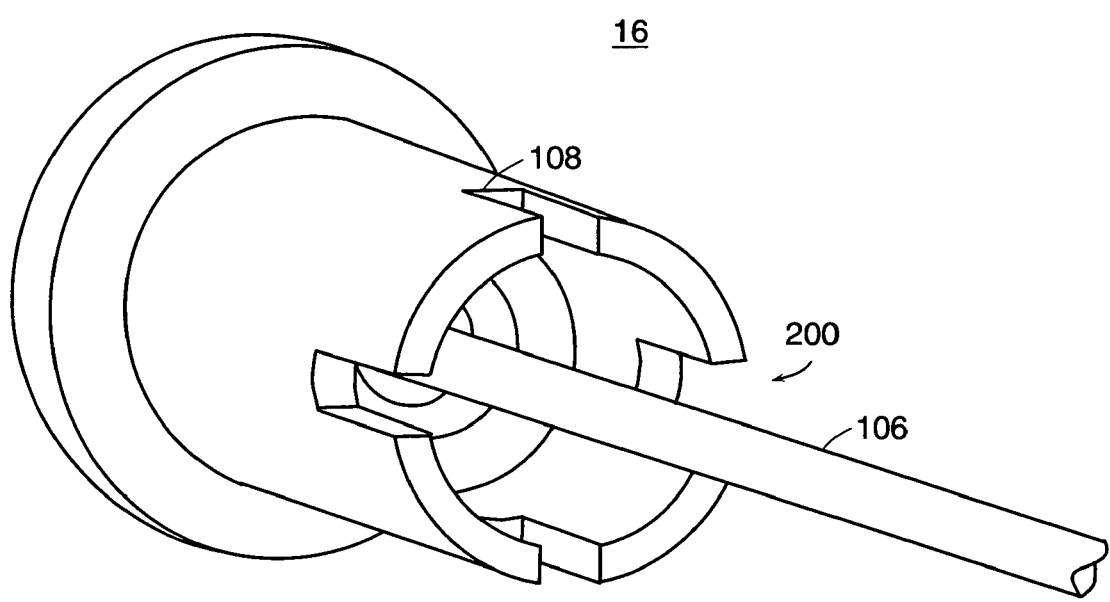
FIG. 4 is a perspective view showing the fiber extending through the feedthrough in the sidewall 16 of the package 10, and specifically, through the ferrule 108.

FIG. 4 shows the second asymmetric stress field location 200. Specifically, to enable the hermetic sealing of the package, the fiber 106 typically passes through a ferrule 108 installed in sidewall 16 into the package. Solder is typically applied in the region between the inner bore of the ferrule and the exterior of the fiber 106, and in some cases, the ferrule may further be crimped to further apply additional stress to the fiber.

In some cases, however, asymmetric stress associated with the ferrule can be process controlled. This is because that generally circular fiber is passes through the generally circular bore of the ferrule.

Figure 5:
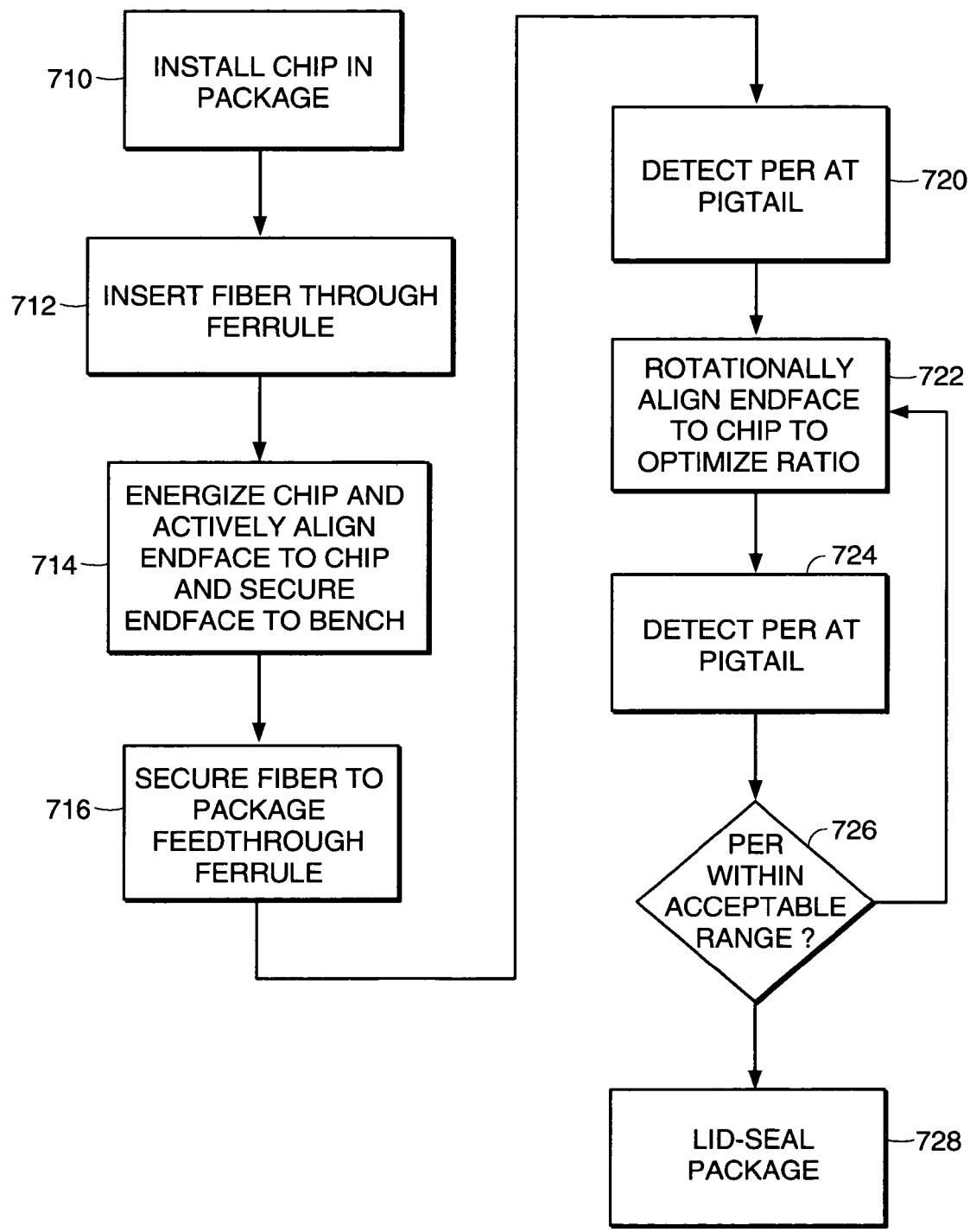
FIG. 5 is a process diagram illustrating the PER compensation according to the present invention.

FIG. 5 shows a manufacturing process, including PER compensation, incorporating the principles of the present invention.

Specifically, as is common and illustrated in step 710, the chip 114 is installed within the package 10. Typically, the chip is installed on the hybrid 112, which is then bonded or otherwise attached to the submount or bench 102. The fiber 106 is then inserted into the package through the fiber feedthrough in the ferrule 108 in step 712.

In the current embodiment, an active alignment process is then performed in step 714 in which the chip 114 is energized and the endface of the fiber is aligned relative to the exit facet of the chip. Either before or after this active aligning process, the fiber is secured in proximity to the submount or bench 102 using mounting structure 104.

As illustrated in step 716, as also part of the manufacturing process, the package is sealed around the fiber in the fiber feedthrough. In one implementation, solder material is filled in around the fiber in the ferrule.

With these manufacturing steps, asymmetric stress fields have been applied to the PM fiber 106. The resulting effect on the PER is detected in step 720.

Figure 6:
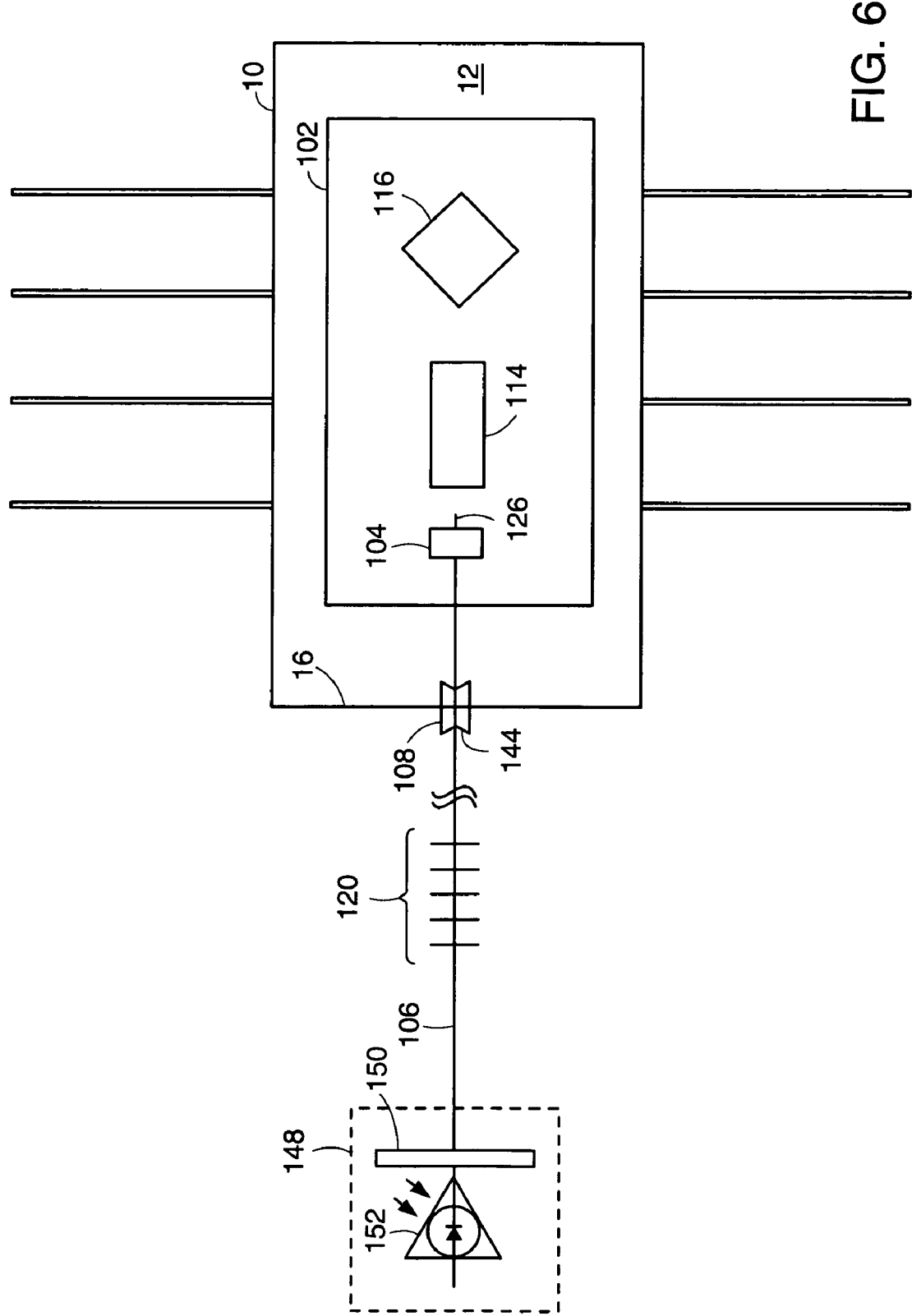
FIG. 6 is a schematic showing the manufacturing test system of the present invention.

FIG. 6 is a schematic block diagram illustrating the manufacturing test system that is used to detect the PER of the system. Specifically, the semiconductor laser chip 114, which is installed on the bench 102 in the package 10, is energized. The generated polarized light is coupled in the fiber 106, which has been inserted into the package through the front wall 16 and secured to the branch 102 via mounting structure 104. Further, alignment has taken place, so that the endface 146 is held in relation to the front facet of the semiconductor laser such that a desired coupling efficiency has been achieved. Most importantly, all of the stresses that will be applied to the fiber as part of the manufacturing, exist. Specifically, solder 144 has been placed around the fiber 106 in the ferrule and the fiber is bonded to the mounting structure 104.

Further, in a fiber stabilized pump scenario, a fiber Bragg grating 128 exists in the fiber pigtail 106 at some typically specified distance from the semiconductor chip 114.

As part of the testing scheme, a polarization extinction ratio meter 148 is attached to the fiber pigtail 106. Preferably, this meter is a fully-automatic system that directly measures the extinction ratio. Such meters are commercially available and typically comprise a rapidly rotating polarizer 150 in front of a photodetector 152.

Returning to FIG. 5, using the system illustrated in FIG. 6, the PER is detected at the end of the pigtail 106 using the PER meter 148 in step 720.

Thereafter, the endface 126 of the fiber is rotationally aligned to the semiconductor laser 114 in step 722. Specifically, by rotationally aligning the endface 126 of the laser, the angle at which the single polarization light is launched into the fiber pigtail is changed. By changing this orientation, any stress-induced PER degradation associated with the fiber can be compensated.

Figure 7:
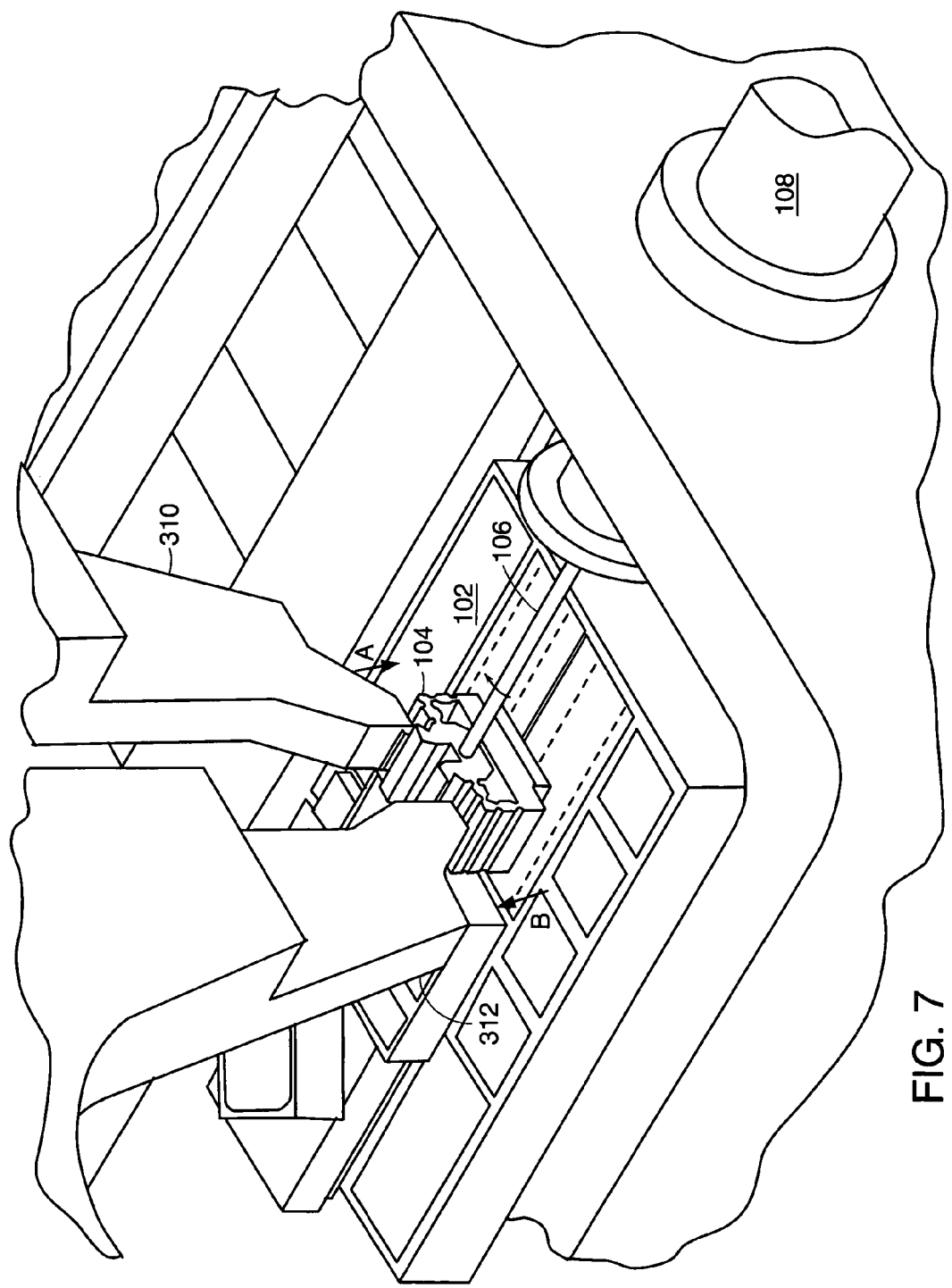
FIG. 7 is a perspective view showing the deformation of the mounting structure to rotationally align the fiber to the laser chip according to the present invention.

FIG. 7 is a perspective view showing deformation of the mounting structure 104 to achieve the PER compensation according to the present invention. Specifically, according to the present invention, a manufacturing system as described in U.S. patent application Ser. No. 09/667,186, entitled OPTICAL SYSTEM ALIGNMENT SYSTEM, by Jenner, et al., filed on Sep. 21, 2000, is used to mechanically engage the mounting structure as described in U.S. patent application Ser. No. 09/689,349, entitled ALIGNMENT SYSTEM OPTICAL COMPONENT INTERFACE, by Jenner, et al., filed on Oct. 12, 2000. Both of these applications are incorporated herein by this reference in their entirety.

Specifically, jaws 310, 312 engage the mounting structure 104 and are actuated in an opposed fashion. For example, to rotate the fiber endface in a clockwise direction, jaw 310 is moved in the direction of arrow A while jaw 312 is moved in the direction of arrow B. Specifically, the endface is rotated relative to the semiconductor laser chip to rotationally align the endface such that the desired PER ratio is achieved.

In the preferred embodiment, a plastic deformation process is used in which the mounting structure 104 is deformed until a desired polarization extinction ratio is achieved. Specifically, the highest polarization extinction ratio is sought such that light exiting from the fiber has only a single polarization. Then, the mounting structure is further deformed, such that when it is released, the mounting structure will hold the fiber in an orientation corresponding to the desired polarization extinction ratio.

Returning to FIG. 5, this process of detecting the PER and then rotationally aligning the endface to the chip includes several iterations of the deformation step 722 and a subsequent PER detection step 724 until the desired PER is achieved in step 726. Once this occurs, a lid-sealing step is performed in step 728 in which a lid is added to the package 10 so that it is hermetically sealed.

Alternatively, in another embodiment of the process, the PER compensation is performed after the fiber has been bonded to the mounting structure but prior to ferrule sealing. After PER compensation, the ferrule is sealed.

This alternative embodiment is viable because process control can be used to create symmetry in stress field 200. Moreover, PER rotational compensation without ferrule bonding avoids the danger of torsional stresses being introduced into the fiber 106 between the mounting structure and the ferrule 108.

While this invention has been particularly shown and described with references to preferred embodiments thereof, it will be understood by those skilled in the art that various changes in form and details may be made therein without departing from the scope of the invention encompassed by the appended claims. For example, the present invention has application outside of the specific pump laser example herein. In other lasers and further in the case of coupling light in the polarization anisotropic devices such as semiconductor optical amplifiers, fiber endface-device rotation alignment for PER compensation is advantageous.

What is claimed is:

1. A process for manufacturing a semiconductor laser system, the process comprising:
    installing a semiconductor chip in a package on a bench;
    inserting a polarization-maintaining optical fiber through a fiber feedthrough into the package;
    securing an endface of the optical fiber to the bench to receive light generated by the semiconductor chip using a mounting structure;
    after the step of securing the endface of the bench, detecting a polarization extinction ratio of light transmitted through the fiber from the semiconductor chip; and
    axially rotating the endface of the fiber relative to the bench to improve the polarization extinction ratio by deforming the mounting structure.

2. A process as claimed in claim 1, further comprising aligning the endface to the semiconductor chip.

3. A process as claimed in claim 2, wherein the step of aligning the endface to the semiconductor chip comprises energizing the semiconductor chip and monitoring a magnitude of light coupled into the optical fiber.

4. A process as claimed in claim 3, wherein the endface is secured after the aligning step.

5. A process as claimed in claim 2, wherein the step of aligning the endface to the semiconductor chip comprises
    energizing the semiconductor chip and monitoring a magnitude of light coupled into the optical fiber; and
    positioning the endface relative to the semiconductor chip to maximize the magnitude of the light coupled into the optical fiber.

6. A process as claimed in claim 1, further comprising securing the fiber in a ferrule surrounding the fiber in the feedthrough.

7. A process as claimed in claim 1, wherein the step of detecting the polarization extinction ratio of light transmitted through the fiber comprises detecting a magnitude of light transmitted along a slow axis of the polarization-maintaining optical fiber and detecting a magnitude of light transmitted along a fast axis of the polarization-maintaining optical fiber, from the semiconductor chip.

8. A process as claimed in claim 1, where the step of axially rotating the endface of the fiber comprises plastically deforming a mounting structure that secures the optical fiber to the bench.

9. A process as claimed in claim 1, wherein the step of axially rotating the endface of the fiber comprises:
    deforming a mounting structure that secures the optical fiber to the bench until a desired polarization extinction ratio is detected; and then
    further deforming the mounting structure such that when released, the mounting structure will hold the fiber in an orientation corresponding to the desired polarization extinction ratio.

10. A process as claimed in claim 1, wherein the step of securing the endface of the optical fiber to the bench comprises bonding the optical fiber to a mounting structure.

11. A process as claimed in claim 10, further comprising sealing around the fiber in the feedthrough.

12. A process as claimed in claim 11, wherein the step of sealing around the fiber is performed before the step of axially rotating the endface of the fiber to improve the polarization extinction ratio.

13. A process as claimed in claim 11, wherein the step of sealing around the fiber is performed after the step of axially rotating the endface of the fiber to improve the polarization extinction ratio.

* * * * *